April 12, 1932. V. G. APPLE 1,853,160
MOTOR DRIVEN BLOWER
Filed Feb. 10, 1930
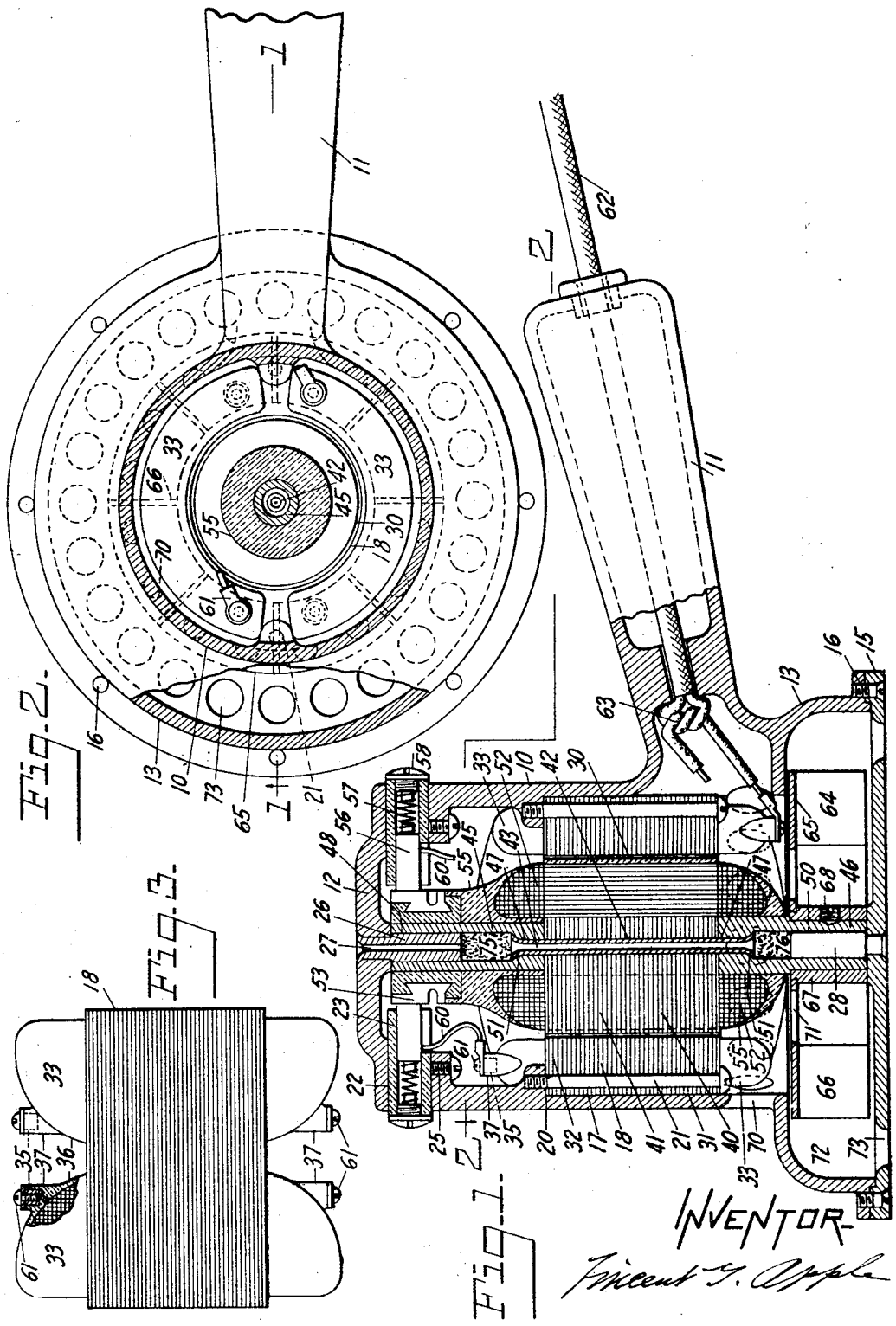
INVENTOR
Vincent G. Apple Patented Apr. 12, 1932

1,853,160

UNITED STATES PATENT OFFICE

VINCENT G. APPLE, OF DAYTON, OHIO

MOTOR DRIVEN BLOWER

Application filed February 10, 1930. Serial No. 427,243.

This invention relates particularly to motor driven blowers, although the adaptation herein shown has valuable features which may be advantageously applied to dynamo electric machines in general.

The objects of the invention are, first, to provide a structure wherein the windings are surrounded by a jacket of insulation which is impervious to moisture; second, to completely enclose the movable elements of the device so that no moving part is exposed at the outer surface; third to provide improved lubricating means for the rotating parts; and fourth, to produce a compact, substantial and inexpensive structure which is more durable and dependable than when made by conventional methods.

These and other objects are attained in the embodiment of my invention hereinafter described, reference being had to the accompanying drawings wherein—

Fig. 1 is a longitudinal vertical section on the line 1—1 of Fig. 2.

Fig. 2 is a section on the line 2—2 of Fig. 1 with parts broken away.

Fig. 3 is a detail view of the field and its coil showing the method of making the terminals.

Similar numerals refer to similar parts throughout the several views.

In the drawings the one piece metal housing 10 having the integral handle 11, is completely closed at the upper end 12, while the lower enlarged open end 13 is closed by the separable end plate 15 secured to the frame by screws 16. The middle part of housing 10 has an opening 17 adapted to receive the field element 18 which is held against shoulder 20 by screws 21.

Openings 22 admit brush tubes 23 made of any suitable insulation. These tubes are held in place by screws 25. A stud 26 having an oil hole 27 extends downwardly into the housing. Another stud 28 extends upwardly from the end plate 15. Studs 26 and 28 extend into openings in the end of the armature 30 to give it rotative support within the field 18.

The field element 18 comprises a core 31 composed of laminæ 32 wound with two coils 33 to create a bipolar field. After the core 31 is built up of the laminæ and the coils 33 are wound in place and the beginning and end of each coil is connected to a metal terminal 35, the structure is placed in a mold and a layer of insulation is pressed into and about the coils to form the moistureproof jacket 36. Bosses 37 are formed around terminals 35 leaving only one end surface of each terminal exposed, the two terminals at the upper end of the core being adapted to be connected to the brushes and the two at the lower end being adapted for connection to the line.

The armature 30 comprises a core 40 composed of laminæ 41. The laminæ 41 have a small opening 42 to admit the hollow rivet 43. Shaft 45 at the upper end of the core and shaft 46 at the lower end of the core have a small hole adjacent the core at 47 to admit rivet 43 but for the remainder of their length are bored larger as at 48 and 50 to admit studs 26 and 28.

Rivet 43 is flared out at the ends 51 thereby temporarily holding the laminæ and the shafts 45 and 46 together and in alignment. The coils 52 are then wound on the core, the commutator 53 placed on the shaft 45 and connected to the leads, and the wound structure is placed in a mold, and a jacket 55 of insulation is molded into and around the coils whereby the shafts, core and coils are permanently held together and in alignment.

Brushes 56 are kept in contact with the commutator 53 by springs 57 in the usual manner and caps 58 close the outer ends of brush tubes 23. Brush leads 60 extending from brushes 56 are connected by screws 61, one lead to each terminal 35 at the upper end of the field element, and a length of lamp cord 62 is brought in through the handle 11, knotted as at 63 and attached to the two terminals 35 at the lower end of the field element.

The impeller 64 comprises a sheet metal disc 65, with laterally extending portions 66 for blades, the disc being secured to a hub 67 which fits over shaft 46 and is itself secured to the shaft by screw 68. Openings 70 in the housing 10 admit air which is drawn through openings 71 in disc 65 and forced outwardly into the pressure chamber 72 out of a series of openings 73 in the end plate 15. The outlet openings 73 may of course extend radially outward through the wall of the housing instead of downwardly through the end plate, or, a single discharge nozzle may extend from the pressure chamber 72 if desired.

It will be seen that the entire armature and impeller assembly rotates about the studs 26 and 28, whereby the structure is shortened an amount substantially equal to the length of two bearings, and no rotatable part of the device is exposed at the outer surface. Lubrication is effected through oil hole 27 whereby a wick 75 is saturated to keep stud 26 lubricated, the surplus oil flowing downward through hollow rivet 43 to another wick 76 which keeps the stud 28 lubricated.

Having shown and described an embodiment of my invention, I claim—

1. A dynamo electric machine armature comprising a core, a short tubular shaft at each end of said core, the openings through each of said shafts being of two diameters, the smaller diameter being next to said core, and a tubular rivet extending through said core and through the smaller openings of said shafts the ends of said rivet being flared out into the larger openings of said shaft.

2. The structure defined in claim 1 having a winding on the core extending beyond it at the ends, and a ring of cementitious insulation at each end of the core pressure molded into the winding and around the said short shafts, maintaining the said short shafts in alignment.

3. A dynamo electric machine comprising, the armature defined in claim 1, short studs held against rotation in the ends of said machine extending inwardly partway through the larger openings of the said short tubular shafts, leaving spaces between the ends of said studs and the flared ends of said tubular rivet, one of said studs having an axial oil hole therethrough, and an oil wick filling each of the said spaces.

In testimony whereof I affix my signature.

VINCENT G. APPLE.